(12) United States Patent
Bayard

(10) Patent No.: US 11,901,682 B2
(45) Date of Patent: Feb. 13, 2024

(54) KITCHEN APPLIANCE WITH A KITCHEN APPLIANCE BASE AND A PREPARATION MODULE

(71) Applicant: Vorwerk & Co. Interholding GmbH, Wuppertal (DE)

(72) Inventor: Christian Bayard, Witten (DE)

(73) Assignee: Vorwerk & Co. Interholding GmbH, Wuppertal (DE)

( * ) Notice: Subject to any disclaimer, the term of this patent is extended or adjusted under 35 U.S.C. 154(b) by 0 days.

(21) Appl. No.: 17/889,527

(22) Filed: Aug. 17, 2022

(65) Prior Publication Data
US 2023/0058496 A1    Feb. 23, 2023

(30) Foreign Application Priority Data

Aug. 20, 2021   (EP) .................................... 21192448

(51) Int. Cl.
| | |
|---|---|
| *H01R 33/76* | (2006.01) |
| *A47J 43/07* | (2006.01) |
| *H01R 33/97* | (2006.01) |
| *H02K 7/116* | (2006.01) |
| *H02K 7/16* | (2006.01) |

(52) U.S. Cl.
CPC ...... *H01R 33/7607* (2013.01); *A47J 43/0716* (2013.01); *H01R 33/765* (2013.01); *H01R 33/7671* (2013.01); *H01R 33/97* (2013.01); *H02K 7/16* (2013.01)

(58) Field of Classification Search
CPC .............. H01R 33/7607; H01R 33/765; H01R 33/7671; H01R 33/97; A47J 43/0716; A47J 43/046; H02K 7/116; H01H 3/163
See application file for complete search history.

(56) References Cited

U.S. PATENT DOCUMENTS

| | | | | |
|---|---|---|---|---|
| 11,476,539 B1 * | 10/2022 | Olsson | ................ | H01M 10/613 |
| 2014/0154535 A1 * | 6/2014 | Olsson | ................ | H01M 10/613 |
| | | | | 429/53 |

FOREIGN PATENT DOCUMENTS

| | | | | |
|---|---|---|---|---|
| DE | 9912750 A1 | 9/2000 | | |
| EP | 0895742 A1 | 2/1992 | | |
| EP | 3367464 A1 * | 8/2018 | ................ | B25F 5/02 |
| FR | 2908620 A1 | 5/2008 | | |
| WO | 2007110493 A2 | 10/2007 | | |

* cited by examiner

*Primary Examiner* — Jean F Duverne
(74) *Attorney, Agent, or Firm* — Dickinson Wright PLLC

(57) ABSTRACT

A kitchen appliance, including at least one kitchen appliance base and at least one preparation module is provided. The kitchen appliance base includes at least one electrical interface and at least one receiving region. The preparation module includes at least one electrical counter-interface for electrical contacting with the electrical interface. The electrical interface includes at least two power contacts and at least one auxiliary contact. The electrical counter-interface includes at least two power counter-contacts and at least one auxiliary counter-contact. In the kitchen appliance, the insertion forces for the electrical contacting for the user are reduced, are realized by the power contacts and the power counter-contacts, as well as the auxiliary contact and the auxiliary counter-contact being designed and configured such that the power contacts are electrically contacted with the power counter-contacts at a different point in time than is the auxiliary contact with the auxiliary counter-contact.

21 Claims, 12 Drawing Sheets

KITCHEN APPLIANCE WITH A KITCHEN APPLIANCE BASE AND A PREPARATION MODULE

CROSS REFERENCE TO RELATED APPLICATIONS

This application claims the benefit of priority under 35 U.S.C. § 119 to European Patent Application No.: 21192448.5, filed Aug. 20, 2021, the contents of which is incorporated herein by reference in its entirety.

FIELD

The invention relates to a kitchen appliance, including at least one kitchen appliance base and at least one preparation module. The kitchen appliance base may include at least one electrical interface and at least one receiving region for the preparation module. The electrical interface may include at least two electrical power contacts and at least one electrical auxiliary contact. The preparation module may include at least one electrical counter-interface corresponding to the electrical interface. The electrical counter-interface may include at least two electrical power counter-contacts and at least one electrical auxiliary counter-contact.

BACKGROUND

The statements in this section merely provide background information related to the present disclosure and several definitions for terms used in the present disclosure and may not constitute prior art.

Kitchen appliances including kitchen appliance base and preparation module are known in a variety of designs. Such kitchen appliances serve for automatic, partially automatic, or manual preparing, for example, crushing, grinding, pressing, stirring, cooking, and/or keeping-warm, in particular of foodstuffs. The kitchen appliance usually includes a kitchen appliance base that provides a receiving region for at least one preparation module. The receiving region often includes at least one electrical interface in order to supply the preparation module introduced in the receiving region with at least one working voltage, for example for a heating device, or for example, in order to contact sensors. Via the interface, other control information could also be transmitted, and different working voltages could also be conveyed.

Alternatively or additionally, in the receiving region at least one drive interface is provided, which for example, serves for the transmission of a torque from a working unit, for example, a motor, of the kitchen appliance base, for example, to a tool disposed on the preparation module.

In addition, the kitchen appliance base usually includes a locking means in order to prevent a removing of the preparation module after the locking to the kitchen appliance base. The locking ensures a safe working process, and in particular prevents an accidental removing of the preparation module during a working process.

It is known that during the disposing of the preparation module in the receiving region, the power contacts and the auxiliary contacts are automatically contacted during the disposing by their being disposed such that they abut against each other after the disposing.

Although conventional kitchen appliances already ensure a high user convenience, during the disposing of the preparation module, in particular for the overcoming of seals, a great force must be applied by the user to ensure the electrical contacting.

An objective of the underlying the invention is therefore a kitchen appliance, as well as a kitchen appliance base and a preparation module, wherein the insertion forces for the electrical contacting are reduced for the user.

SUMMARY

The above-mentioned objective is achieved by a kitchen appliance formed according to the teachings of the present disclosure. More specifically, this kitchen appliance includes at least one kitchen appliance base and at least one preparation module. The kitchen appliance base includes at least one electrical interface and at least one receiving region. The preparation module includes at least one electrical counter-interface for electrical contacting with the electrical interface. The electrical interface includes at least two power contacts and at least one auxiliary contact. The electrical counter-interface includes at least two power counter-contacts ($8a$) and at least one auxiliary counter-contact. In this kitchen appliance the power contacts and the power counter-contacts, as well as the auxiliary contact and the auxiliary counter-contact are formed and configured such that the power contacts are electrically contacted by the counter-power contacts at a different point in time than is the auxiliary contact by the auxiliary counter-contact.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

In order that the disclosure may be well understood, there will now be described various forms thereof, given by way of example, reference being made to the accompanying drawings, in which.

Figure 1:
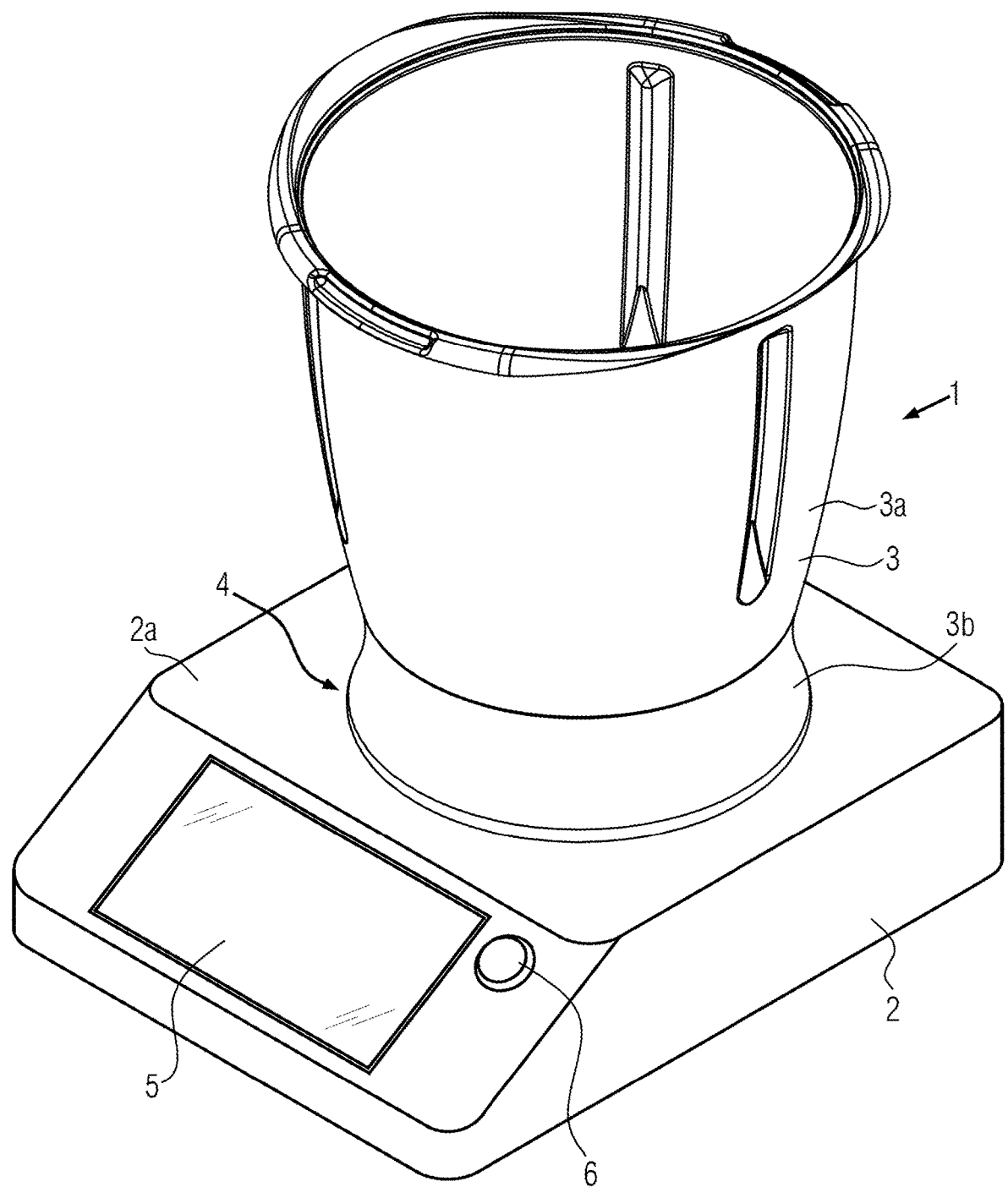
FIG. 1 shows a perspective view of a kitchen appliance including a preparation module and kitchen appliance based according to the teachings of the present disclosure.

The drawings are provided herewith for purely illustrative purposes and are not intended to limit the scope of the present invention.

DETAILED DESCRIPTION

The following description is merely exemplary in nature and is in no way intended to limit the present disclosure or its application or uses. It should be understood that throughout the description, corresponding reference numerals indicate like or corresponding parts and features.

Within this specification, embodiments have been described in a way which enables a clear and concise specification to be written, but it is intended and will be appreciated that embodiments may be variously combined or separated without parting from the invention. For example, it will be appreciated that all preferred features described herein are applicable to all aspects of the invention described herein.

In general, the kitchen appliance comprises at least one kitchen appliance base and at least one preparation module. The kitchen appliance base includes at least one electrical interface and at least one receiving region. The preparation module includes at least one electrical counter-interface for electrical contacting with the electrical interface. The electrical interface includes at least two power contacts and at least one auxiliary contact. The electrical counter-interface includes at least two power counter-contacts (8a) and at least one auxiliary counter-contact. In this kitchen appliance the power contacts and the power counter-contacts, as well as the auxiliary contact and the auxiliary counter-contact are formed and configured such that the power contacts are electrically contacted by the counter-power contacts at a different point in time than is the auxiliary contact by the auxiliary counter-contact.

In this context "electrically contacts" does not mean the actual application of an electrical signal or an electrical voltage to the contacts, but rather the physical contact that in principle makes possible a conducting of current or signals. "At a different point in time" means that, for example, the auxiliary contact is contacted by the auxiliary counter-contact temporally before the power contact is contacted by the power counter-contact, or vice versa. The contacting can be effected with very small temporal spacing, in any case, however, not simultaneously.

At least two, in particular precisely two, at least three, in particular precisely three, at least four, in particular precisely four, auxiliary contacts are preferably provided. All auxiliary contacts are preferably contacted temporally before the power contacts. The auxiliary contacts are preferably contacted simultaneously. For example, according to one aspect of the present disclosure, the auxiliary contacts are present in redundant groups, for example, at least two groups each including four auxiliary contacts, wherein in a manner dependent on the orientation of a preparation module, only four of the auxiliary contacts are respectively contacted by the preparation module. A preparation module can thereby be disposed in at least two different orientations, wherein the auxiliary contacts are simultaneously contactable. Each two auxiliary contacts from the two groups are preferably connected in parallel in pairs. For example, the auxiliary contacts are disposed symmetrically on the kitchen appliance base such that a preparation module is arrangeable in at least two different orientations.

When only a single auxiliary contact is provided, it is in particular configured and disposed such that it is contactable in two different arrangements of a preparation module. For example, for this purpose the auxiliary contact extends at least over a part of a circumferential surface, in particular of a contact carrier module, in the receiving region.

The electrical interface may include at least two, in particular precisely two, at least three, in particular precisely three, at least four, in particular precisely four, at least five, in particular precisely five, at least six, in particular precisely six, power contacts. The number of power contacts and the corresponding number of power counter-contacts depends on the type and number of the electrical consumers of the preparation module. If the preparation module includes, for example, a heating device, two power contacts are present. If the preparation module includes, for example, two heating devices, then three or four power contacts and three or four power counter-contacts are preferably present.

According to another aspect of the present disclosure the power contacts or the power counter-contacts, and the auxiliary contacts or the auxiliary counter-contacts being disposed at different positions on the kitchen appliance base or the preparation module such that during the disposing of the preparation module in the receiving region of the kitchen appliance base, the above-mentioned contacts are all contacted by the disposing, however, the power contacts and the power counter-contacts are contacted at a different point in time than is the auxiliary contact to the auxiliary counter-contact. In particular, the auxiliary contacts are first contacted by the auxiliary counter-contacts, and subsequently the power contacts are contacted by the power counter-contacts.

For example, the present disclosure provides that the two power counter-contacts may be configured as contact pins on the preparation module, and the power contacts are configured as corresponding contact sockets on the kitchen appliance base. The auxiliary contact or the auxiliary contacts, or the auxiliary counter-contact or the auxiliary counter-contacts, have a shape deviating from the pin shape or socket shape. For example, the auxiliary contact is or the auxiliary contacts may be configured as preferably resilient contact clamps, and/or the auxiliary counter-contact or the auxiliary counter-contacts as contact surfaces. According to another aspect of the present disclosure, the resilient contact clamps are disposed in particular such that they are contacted by the contact sockets temporally before the contact pins. For example, the length of the contact pin may be chosen such that a contacting is only effected directly before the conclusion of the disposing process.

Furthermore, the present disclosure provides that the power contacts may be configured as being sealed, and that the auxiliary contact or the auxiliary contacts are configured as unsealed. At least one power contact configured as contact socket preferably includes a sealing means or sealing cap that prevents a penetration of liquid into the contact socket. All power contacts preferably include a sealing cap or a sealing means. The auxiliary contacts are open or are unsealed.

The present disclosure advantageously provides that the power contacts and the auxiliary contacts may be disposed separated from one another on the kitchen appliance base, or that the power counter-contacts and the auxiliary counter-contacts are disposed separated from one another on the preparation module.

In particular, the present disclosure provides that the power contacts may be configured as a first interface type, and the auxiliary contact or the auxiliary contacts as second interface type. First and second interface type may be configured differently. The power counter-contacts and the auxiliary counter-contacts are each configured as interface types corresponding to the first or to the second interface type.

The auxiliary contacts may be configured, for example, for measurement-, control-, and/or regulation-purposes. At least one auxiliary contact is preferably configured as protective conductor, and/or at least two auxiliary contacts are configured as signal contacts, in particular for at least one temperature sensor, preferably a thermocouple, of the preparation module, and/or at least one auxiliary contact is configured as cover contact, and/or at least one auxiliary contact is configured for the transmitting of data and/or signals to the preparation module, and/or at least one auxiliary contact is configured to supply voltage to components in a preparation module with non-critical voltages for a contacting.

The present disclosure quite preferably provides that a contacting of the power contacts by the power counter-contacts is only effected when the preparation module is disposed completely in the receiving region, i.e., the disposing process is concluded.

The receiving region of the kitchen appliance base is configured and designed for connecting to the preparation module. The preparation module is preferably at least partially received in the receiving region. The receiving region for the preparation vessel is preferably configured, with respect to its shape, at least partially essentially corresponding to a base section of the preparation module, in particular in order to receive the preparation module at least partially in a positive-locking manner. The receiving region is in particular configured such that a rotation of the preparation module relative to the kitchen appliance base is already prevented by the at least two defined orientations. In the two orientations relative to the kitchen appliance base, a positive locking that prevents a rotation is already realized during the disposing of the preparation module in the receiving region.

The kitchen appliance base preferably includes at least one housing, on which the receiving region is formed for the receiving of at least one preparation module. The receiving region is preferably disposed essentially in a plane E, which is formed parallel to a footprint of the kitchen appliance base with conventional use. The kitchen appliance base preferably includes in particular at least one working unit, including at least one electric motor, whose torque is transmissible via a drive interface in the receiving region. Alternatively or additionally, the kitchen appliance base includes at least one weighing device for the weighing of foodstuffs disposed in the preparation module, as well as at least one mains connection for the voltage supply.

A control device of the kitchen appliance, in particular of the kitchen appliance base, controls, for example, at least partially automatically or automatically, a heating process of the preparation module, or a preparation process of a foodstuff. Using the control device, program sequences for the preparation of foodstuffs, for example, recipes, are preferably also controlled, in particular partially automatically or automatically. The kitchen appliance base or the kitchen appliance is preferably configured for the automatic, partially automatic, or manual preparation, for example, crushing, grinding, pressing, stirring, cooking, and/or keeping-warm, in particular of foodstuffs.

The preparation module preferably includes at least one electrical heating device, in particular at least two electrical heating devices. Each electrical heating device is contacted via the electrical counter-interface. For example, the preparation module includes at least one tool, for example, a reaming tool, a stirring tool, and/or a crushing tool. Furthermore, the present disclosure provides that the tool may be configured, for example, as a fruit- and/or vegetable-press or reamer. The present disclosure provides that the functions of the above-mentioned tools may be combined in one tool. The preparation module includes, in particular, at least one drive interface in order to transfer torques from a working unit, for example, a motor, of the kitchen appliance base to a tool disposed in the preparation module.

The preparation module preferably includes a preparation interior for the receiving of foodstuffs. The preparation module may be configured, for example, as preparation pot, in particular including at least one integrated heating device and at least one integrated stirring device.

The present disclosure also provides that the preparation module includes as heating module at least one heating surface that is heatable using at least one heating device, and on which at least one vessel can be placed, in particular a pot or a wok or a pan.

Compared to conventional technology, the kitchen appliance according to the present disclosure has the advantage that due to the temporally different contacting of the power contacts and of the auxiliary contact or of the auxiliary contacts, the required insertion force is reduced, since the required insertion force is temporally divided. User convenience is thereby also increased. If the auxiliary contacts make contact before the power contacts, user safety is also increased, since at least one of the auxiliary contacts is usually configured as protective conductor, and thus the protective conductor is contacted before the power contacts.

A first design of the kitchen appliance provides that the power contacts and/or the auxiliary contact and/or the power counter-contacts and/or the auxiliary counter-contact are disposed on a notional, common circular path or on a notional circle with respect to each other at different angular positions on the kitchen appliance base or on the preparation module. The angle positions are preferably chosen such that the preparation module is electrically completely contacted in at least two provided orientations in the receiving region. For example, the power contacts and the auxiliary contact or the auxiliary contacts are spaced with respect to one another on circular segments with angles of less than 90° with respect to one another. The auxiliary contacts are preferably offset with respect to one another at an angle of 10° to 40°, in particular approximately 35° with respect to one another.

On the notional circle the power contacts advantageously have a spacing of at least 90°, preferably 180°, to one another. The same applies for the power counter-contacts and the auxiliary counter-contacts on the preparation module. In this way, in particular the electrical contacting in at least two orientations can be ensured. Four power contacts are preferably provided, which are each disposed at an angle of 90° with respect to one another, in particular movably. This design is in particular advantageous when two heating devices are disposed on the preparation module.

Alternatively thereto the present disclosure also provides that the power contacts and/or the auxiliary contact and/or the power counter-contacts and/or the auxiliary counter-contact, or the plurality of auxiliary contacts or plurality of auxiliary counter-contacts may be respectively disposed at different angular positions on notional, different circular paths or notional circles having different radii.

For example, the power contacts and the power counter-contacts may be disposed on a notional circular path having a first radius. The auxiliary contacts or the auxiliary counter-contacts are each disposed on a circular path having a second radius. The first radius is preferably smaller or larger than the second radius.

At least four auxiliary contacts or at least four auxiliary counter-contacts are preferably respectively provided as a group, wherein a second group including four auxiliary counter-contacts or auxiliary contacts is disposed on the radius opposite the first group, so that a preparation module can be disposed in two different orientations, and always at least four of the auxiliary contacts are each contacted by the auxiliary counter-contacts.

According to a further, particularly preferred embodiment of the kitchen appliance, the present disclosure provides that at least one of the power contacts, preferably both power contacts, and/or at least the auxiliary contact of the electrical interface is movable from a rest position at least toward a contact position, in particular at least between a rest position and a contact position. The power contact or the power contacts and/or the auxiliary contact or the auxiliary contacts are consequently held movably on the kitchen appliance base and movable between a rest position, at which no contact is present, and a contact position, wherein the corresponding contacts are physically contacted by counter-contacts.

Alternatively or additionally the present disclosure provides that at least one of the power counter-contacts, preferably both power counter-contacts, and/or at least the auxiliary counter-contact or the auxiliary counter-contacts of the counter-interface are movable on the preparation module from a rest position at least toward a contact position, in particular at least between a rest position and a contact position. The power counter-contacts or the auxiliary counter-contacts are consequently held movably on the preparation module, and during and/or after the disposing of the preparation module are moved from a rest position at least toward a contact position.

When the specific movability of only a single one of the contacts—power contact, power counter-contact, auxiliary contact, auxiliary counter-contact—is described above or below in the singular, a movability of a plurality of the respective contacts—if available—is thus always disclosed in the plural. According to the present disclosure, the invention provides that only a part of the contacts of the electrical interface and/or of the electrical counter-interface, or all contacts of the electrical interface and/or of the electrical counter-interface are movable from a rest position into a contact position.

The movement of the power contact, of the power counter-contact, of the auxiliary contact, and/or of the auxiliary counter-contact is effected rotationally, translationally, or as a combination therefrom. The movement is effected, for example, radially, i.e., in a plane that is, for example, parallel to a footprint of the kitchen appliance base, or axially, i.e., in a direction that is oriented orthogonal to a footprint of the kitchen appliance base. The present disclosure also provides that the movement is effected in a direction that is inclined with respect to the footprint of the kitchen appliance base. For example, the auxiliary contact is moved differently than the power contact.

The movement of the power contact, of the power counter-contact, of the auxiliary contact, and/or of the auxiliary counter-contact is preferably effected during and/or after the disposing of the preparation module in the receiving region. The present disclosure provides that the movement of the contacts already begins during the disposing of the preparation module in the receiving region, and is ended after the conclusion of the disposing or simultaneously with the conclusion of the disposing. Furthermore, the present disclosure also provides that the power contact, the power counter-contact, the auxiliary contact, and/or the auxiliary counter-contact is only moved from the rest position into the contact position when the preparation module is finally disposed in the receiving region. The movement of the power contact, of the power counter-contact, of the auxiliary contact, and/or of the auxiliary counter-contact is preferably effected at least partially, in particular completely and simultaneously with a mechanical locking of the preparation module to the kitchen appliance base. Furthermore, the present disclosure provides that the movement of the power contact, of the power counter-contact, of the auxiliary contact, and/or of the auxiliary counter-contact is effected at a different point in time than the mechanical locking of the preparation module to the kitchen appliance base, for example, before the mechanical locking or after the mechanical locking.

The present disclosure also provides that the electrical contacting is effected at least partially simultaneously and at least partially before or after the mechanical locking. For example, the auxiliary contacts are contacted before the mechanical locking, and the power contacts are contacted at least partially simultaneously or completely simultaneously with the locking, or the power contacts are contacted after the locking.

Compared to conventional technology, this exemplary embodiment has the advantage that the disposing of the preparation module in the receiving region is simplified. The insertion forces for the user are reduced, since no insertion forces need to be applied for a part of the contacts of the electrical interface or of the electrical counter-interface during the disposing in the receiving region, since at least this part of the contacts are only subsequently contacted by the movement. Furthermore, the number of seals can be reduced, since the risk of a contact with moisture in the rest position is in any case reduced.

According to a further design according to the teachings of the present disclosure, the power contacts, the power counter-contacts, the auxiliary contact, and the auxiliary counter-contact are manufactured from an electrically conductive material, wherein at least a part of a contact surface of the respective contact, in particular the surface that, in the case of contact, is in contact with the associated counter-contact, is provided with a coating for the reduction of the transition resistance. Here the present disclosure preferably provides that the contacts themselves are manufactured from a cost-effective electrically conductive material, for example, a steel, in particular spring steel or a stainless steel. The coating preferably comprises an alloy that contains at least gold and/or silver or is manufactured from gold and/or silver. The coating is applied, for example, on the contacts using physical vapor deposition (PVD), chemical vapor deposition (CVD), or, for example, using an additive manufacturing method, for example, 3D printing. The coating is preferably applied by electroplating.

According to yet another further design of the kitchen appliance it is particularly preferred that the power contact, the auxiliary contact, the power counter-contact, and/or the auxiliary counter-contact are/is movable at least indirectly, in particular directly and/or automatically, using a drive unit. A drive unit is disposed, for example, in the kitchen appliance base and/or in the preparation module. The drive unit comprises, for example, an electric motor and at least one gear, for example, at least one worm-, spur-, and/or conical gear, and/or at least one drive belt and/or at least one drive chain. The motor is configured, for example, as rotating electric motor or as linear motor. The drive unit is preferably attached in a vibration-damped manner.

Alternatively thereto the present disclosure provides that a transmission is disposed on the motor, which transmission in particular includes a plurality of gears. The drive unit is at least indirectly mechanically connected to the power contacts, the auxiliary contact, the power counter-contacts, and/or the auxiliary counter-contact, so they/it are/is movable by the drive unit.

The kitchen appliance base may also include in particular a control device. The drive unit is preferably controlled by the control device of the kitchen appliance base, in particular the control device induces a movement toward the rest position or the contact position. The control device preferably comprises power electronics in order to operate at least one heating device, for example, of a preparation module, contacted at the electrical interface.

Furthermore, the present disclosure provides that the drive unit may include at least one clutch device, for example, at least one slip clutch. The clutch device is preferably configured and disposed in the drive unit such that it is triggered in the event that at least one threshold value of a force and/or of a torque is exceeded during a movement, in order to prevent damage to the drive unit and/or other components of the kitchen appliance base and/or of the preparation module.

According to a further design of the kitchen appliance, the present disclosure provides that at least one drive lever is present, and that the drive lever is at least indirectly, in particular directly, movable by the drive unit, in particular rotatable. The drive lever is in operative connection with the drive unit. The power contacts, the auxiliary contact, the power counter-contacts, and/or the auxiliary counter-contact interact with the drive lever such that a movement of the drive lever causes a movement of at least one of the power contacts, at least of the auxiliary contact, at least one of the power counter-contacts, and/or at least of the auxiliary counter-contact from the rest position into the contact position. For example, the power contacts, the auxiliary contact, the power counter-contacts, and/or the auxiliary counter-contact are at least indirectly connected to the drive lever in a positive-locking manner. The drive lever is configured, for example, annular, disk-shaped, or as a circle segment. The present disclosure also provides in particular that instead of the drive lever, a plurality of spur-gear steps may be provided that effect a movement of the above-mentioned contacts.

In particular, in order to further increase user safety, according to a further design the present disclosure provides that at least one of the power contacts, at least the auxiliary contact, at least one of the power counter-contacts and/or at least the auxiliary counter-contact are/is disposed on at least one contact carrier preferably each on at least one contact carrier. The contact carrier is held movable together with the respective contact. For example, the respective contact carrier is guided on the kitchen appliance base or on the preparation module such that it is radially, axially, translationally, and/or rotationally movable. The contact carrier or the contact carriers are preferably each guided on at least one guide rail of the kitchen appliance base.

The present disclosure preferably provides that two power contacts may be present, and that each power contact includes a contact carrier. Furthermore, the present disclosure provides that two contact carriers may be present, and that each contact carrier includes two power contacts, in particular insulated from each other. In addition, the present disclosure provides that four contact carriers may be provided, wherein each contact carrier includes one or two power contacts, in particular wherein the contact carriers are disposed approximately 90° offset in respect to one another. Here the present disclosure provides that each contact carrier serves separately for electrical power contacting of a preparation module, and according to the arrangement of the contact carrier, a preparation module can be disposed in two orientations on the kitchen appliance base. Furthermore, the present disclosure provides that a contact carrier includes two, in particular mutually insulated, power contacts, but these are used for the electrical contacting of two heating devices of the kitchen appliance base, so that simultaneously at least one further power contact, preferably two further power contacts, are disposed on at least one further contact carrier.

Furthermore, the present disclosure provides that all auxiliary contacts may be disposed on a single contact carrier, or that each two or each four auxiliary contacts are disposed on a contact carrier.

The contact carrier is or the contact carriers are preferably manufactured from a flame-retardant plastic. The plastic of the contact carrier or the contact carriers preferably fulfills the requirements of the test according to UL94 of Underwriters Laboratories and/or of the standard DIN EN 60695-11-10 VDE 0471-11-10:2014-10 and/or the standard DIN EN 60695-11-20:2016-04. In this way increased requirements for fire protection are ensured.

The contact carriers enclose the contacts at least partially, so that in particular in the power contacts, the risk of a contact by a user is significantly reduced.

For the movement of the power contact, of the auxiliary contact, of the power counter-contact, and/or of the auxiliary counter-contact, it has been shown advantageous when according to a further design the present disclosure provides that the drive lever includes at least one cutout for interacting with at least one actuator projection on the contact carrier. The cutout is preferably shaped for the contact carrier or for each contact carrier such that a rotational movement of the drive lever is transformed, by interaction of the cutout with the actuator projection, into a translational movement of the contact carrier. At least two contact carriers that each feature at least one power contact or power counter-contact are preferably moved simultaneously by the drive lever. In particular, the two contact carriers are moved in opposite directions, or in directions offset approximately 90° with respect to each other.

According to a further design of the kitchen appliance it has been shown as further advantageous that at least one contact carrier module is disposed on the kitchen appliance base, in particular in the receiving region of the kitchen appliance base. The contact carrier module is preferably configured as disk-shaped. The present disclosure provides that in the rest position, the power contact and/or the auxiliary contact, in particular the contact carrier having the respective power contact or auxiliary contact, is/are completely introduced into the contact carrier module. In the rest position, the contact carriers in particular terminate flush with a circumferential surface of the contact carrier module.

In the rest position all contact carriers are preferably introduced into the contact carrier module, so that in the rest position the contacts disposed therein are protected against contact.

Furthermore, the present disclosure provides that in the contact position, the power contact and/or the auxiliary contact, in particular the respective contact carriers including the above-mentioned contacts, may protrude at least partially from the contact carrier module, in any case such that the respective power contact and/or auxiliary contact is contactable. In this way it is ensured that the power contact and/or the auxiliary contact only protrude when they are actually required. The present disclosure preferably provides that the contact carrier or all contact carriers are configured such that also in the contact position a contact by a user is prevented, for example by having such a narrow gap for contacting, for example by a power counter-contact formed as contact blade, that it cannot be penetrated by a finger. Each of the contact carriers is preferably held translationally movable on the contact carrier module of the kitchen appliance base, in particular radially oriented on a center point of the preferably essentially circular contact carrier module.

The present disclosure advantageously provides that the auxiliary contacts are disposed on at least one circumferential surface of the contact carrier module. The circumferential surface of the contact carrier module preferably extends essentially orthogonally to a top side of the kitchen appliance base. Furthermore, the present disclosure provides that the power contacts may be disposed such that they emerge from the circumferential surface, in particular with the contact carriers, or disappear in the circumferential surface when they are in the rest position.

In order to further increase user safety, according to a further design the present disclosure provides that on a circumferential surface of the contact carrier module in the rest position, a gap is formed between the contact carrier, in particular a head region of the contact carrier, and the contact carrier module such that the risk of a liquid entry is minimized. For example, the gap is configured with a very low tolerance, so that already for constructive reasons no or only a very small amount of liquid can enter. In particular, a spray protection is thereby ensured.

Furthermore, the present disclosure provides that at least one sealing means is disposed between the contact carrier module and the contact carrier, so that the penetrating of liquid into the gap between contact carrier module and contact carrier is prevented by the sealing means. The sealing means includes, for example, at least one sealing lip and/or at least one labyrinth seal and/or at least one contact seal.

According to a further design, the operating convenience of the kitchen appliance can be advantageously increased by the kitchen appliance base including at least one locking element. The locking element is movably, in particular rotatably, held between a release position and a locking position. In the release position, the preparation module can be disposed in at least two orientations in the receiving region. In the locking position, a mechanical locking of the preparation module is effected with the kitchen appliance base. In the locking position of the locking element, at least the power contacts are located in their contact position. In the release position of the locking element, at least the power contacts are located in the rest position.

The present disclosure provides that in the release position of the locking element, the preparation module can be disposed in at least two different orientations in the receiving region. In this context "two different orientations" means that the preparation module can be disposed in the one receiving region in at least two different orientations, in particular rotated with respect to each other. In a first orientation, an operating means of the preparation module is oriented rightward, in a second orientation, for example, oriented leftward.

The present disclosure preferably provides that the orientations of the preparation module in the receiving region are offset by at least 90° with respect to each other. The preparation module can be disposed in the receiving region by precisely two, in particular four, arrangements offset at least 90° with respect to each other. The present disclosure also provides that the two orientations may be offset by precisely 180° with respect to each other. In both orientations a desired contacting of the existing contacts of the electrical interface or of the electrical counter-interface is affected. For example, the preparation module can be disposed and locked in the receiving region in at least two, in particular precisely two, at least three, in precisely three, or at least four, in particular precisely four orientations.

The present disclosure advantageously provides that the locking element is movable, in particular rotatable, at least indirectly, in particular directly, by the drive unit. Here the drive unit is disposed in particular such that it is located outside the center of rotation of the locking element. For example, the present disclosure provides that the drive unit may act on the drive lever that is connected to the locking element in a positive-locking manner. A movement, in particular rotation of the drive lever, consequently effects a rotation of the locking element, in particular between a release position and a locking position. In particular, the locking element is disposed between top side of the kitchen appliance base and contact carrier module.

The locking element and/or the drive lever are preferably rotatable about an axis that also corresponds to the rotational axis of a working unit, in particular of a motor, for driving a tool, preferably inside a preparation module. A shaft for the transmission of a torque to a tool is preferably disposed centrally in the kitchen appliance base, so that it is surrounded by the locking element and/or the drive lever. In particular, the drive lever and/or the locking element include a central opening.

It is preferable that simultaneously with the movement of at least one contact of the above-mentioned contacts, a locking is effected of a preparation module to the kitchen appliance base. The present disclosure preferably provides that in the locking position of the locking element, at least the power contacts are in the contact position, and in the release position of the locking element the power contacts are in their rest position. With the locking of the preparation module to the kitchen appliance base, a contacting of the power contacts is then also effected.

The present disclosure provides in particular that the locking element is configured such that it directly locks the preparation module, i.e., in the locking position it interacts in a positive-locking manner with the preparation module. Alternatively thereto the invention provides that the locking element transmits its movement to a locking counter-element on the preparation module, wherein the locking counter-element, in particular in the locking position, then interacts in a positive-locking manner with locking contours on the top side of the kitchen appliance base. Each locking contour preferably extends from a top side of the kitchen appliance base, in particular essentially perpendicularly upward.

According to a further embodiment of the kitchen appliance base, the present disclosure provides that the locking element may include at least one carrier contour. The carrier contour is configured for interacting with a tapped counter-contour on the locking counter-ring on the preparation module. The carrier contour on the locking element protrudes, for example, on the locking element. At least two carrier contours are preferably provided on the locking element, which are disposed in particular opposite each other on a circumference. In particular, at least three, precisely three, at least four or precisely four carrier contours as well as associated carrier counter-contours are provided.

The carrier contour is configured such that it can interact in a positive-locking manner with a carrier counter-contour on a locking counter-element, in particular locking counter-ring, on the preparation module. In particular, using the carrier contour, a rotation of the locking element is transmissible to the locking counter-element on the preparation module. For example, the carrier contour is configured as carrier rib, and/or the carrier counter-contour as corresponding carrier gap. The positive-locking joining of the carrier contour and the carrier counter-contour is effected by disposing the preparation module in the receiving region. The carrier contours and/or the carrier counter-contours are configured and disposed such that the preparation module can be disposed in two different orientations, in particular in the receiving region.

The locking counter-element is rotatably supported, in particular in a base section of the preparation module. On the locking counter-element, at least one locking section is formed, in particular at least two, in particular at least three or at least four locking sections are formed. The locking counter-element is movable from the locking element between a release position and a locking position. When the locking element is located in the locking position, the locking counter-element is also located in the locking position. If the locking element is in the release position, the locking counter-element is also located in the release position.

In the locking position, the locking section or the locking sections of the locking counter-element interact in a positive-locking manner with at least one locking contour on the top side of the kitchen appliance base, whereby the preparation module is connected in a positive-locking manner to the kitchen appliance base. On the top side of the kitchen appliance base, at least two, in particular precisely two, at least three, in particular precisely three, at least four, in particular precisely four, at least five, in particular precisely five, or at least six, in particular precisely six, locking contours are preferably provided.

The locking contour is or the locking contours are preferably configured hook-shaped, so that a respective locking section of the locking counter-element can rotate under the hook-shaped locking contours in order to lock a preparation module to the kitchen appliance base. The locking contours are preferably designed and configured such that they define the receiving region of the kitchen appliance base.

The present disclosure further relates to a kitchen appliance base, in particular for a kitchen appliance according to at least one of the above-described exemplary embodiments. The kitchen appliance base is characterized in that in particular during and/or after the disposing of the preparation module in the receiving region, at least one of the power contacts and/or at least the auxiliary contact is movable on the kitchen appliance base in particular during and/or after the disposing of the preparation module in the receiving region from a rest position at least toward a contact position, preferably between a rest position and a contact position. At least one of the contacts, at least a part of the contacts, or all contacts are preferably configured movable, so that the contacts are only moved into their contact position when the preparation module is disposed in the receiving region of the kitchen appliance base.

The present disclosure provides that the kitchen appliance base is designed and further developed according to the exemplary embodiments described in the context of the design of the inventive kitchen appliance.

Furthermore, the present disclosure relates to a preparation module, in particular for a kitchen appliance according to one of the above-described exemplary embodiments. The preparation module includes at least two power counter-contacts and at least one auxiliary counter-contact, wherein in particular during or after the disposing of the preparation module in the receiving region, at least one of the power counter-contacts and/or the auxiliary counter-contacts is movable on the preparation module from a rest position at least toward a contact position, preferably between a rest position and a contact position. The moving of the above-mentioned contacts or of a part of the above-mentioned contacts is effected indirectly or directly by the drive lever and/or the locking element and/or the locking counter-element.

The present disclosure provides that the preparation module is designed and further developed according to the exemplary embodiments described in the context of the design of the kitchen appliance.

Further advantageous designs according to the teachings of the present disclosure are evident from the following description of figures.

In the various figures of the drawings identical parts are always identified with the same reference numbers.

For the subsequent description it is emphasized that the present disclosure is not limited to the exemplary embodiments and not to all or a to plurality of features of described feature combinations, but rather each individual partial feature of the/each exemplary embodiment is also of significance for the subject matter of the entire invention, separately from all other partial features described in this connection and also in combination with any other features of another exemplary embodiment.

FIG. 1 shows a kitchen appliance 1 including a kitchen appliance base 2 and a preparation module 3. In this embodiment the preparation module 3 is configured as a preparation vessel. According to FIG. 1, the preparation module is disposed in a receiving region 4 of the kitchen appliance base 2. The kitchen appliance base 2 includes an operating and display device 5. In addition, at least one operating means 6 that is configured here as rotary- and push-button can be present. Using the operating and display device 5 and the operating means 6, functions can be controlled, and programs, in particular preparation programs, can be started. A top side 2a of the kitchen appliance base 2 is configured essentially flat and parallel to a base surface of the kitchen appliance base 2 during the usual use.

Figure 7:
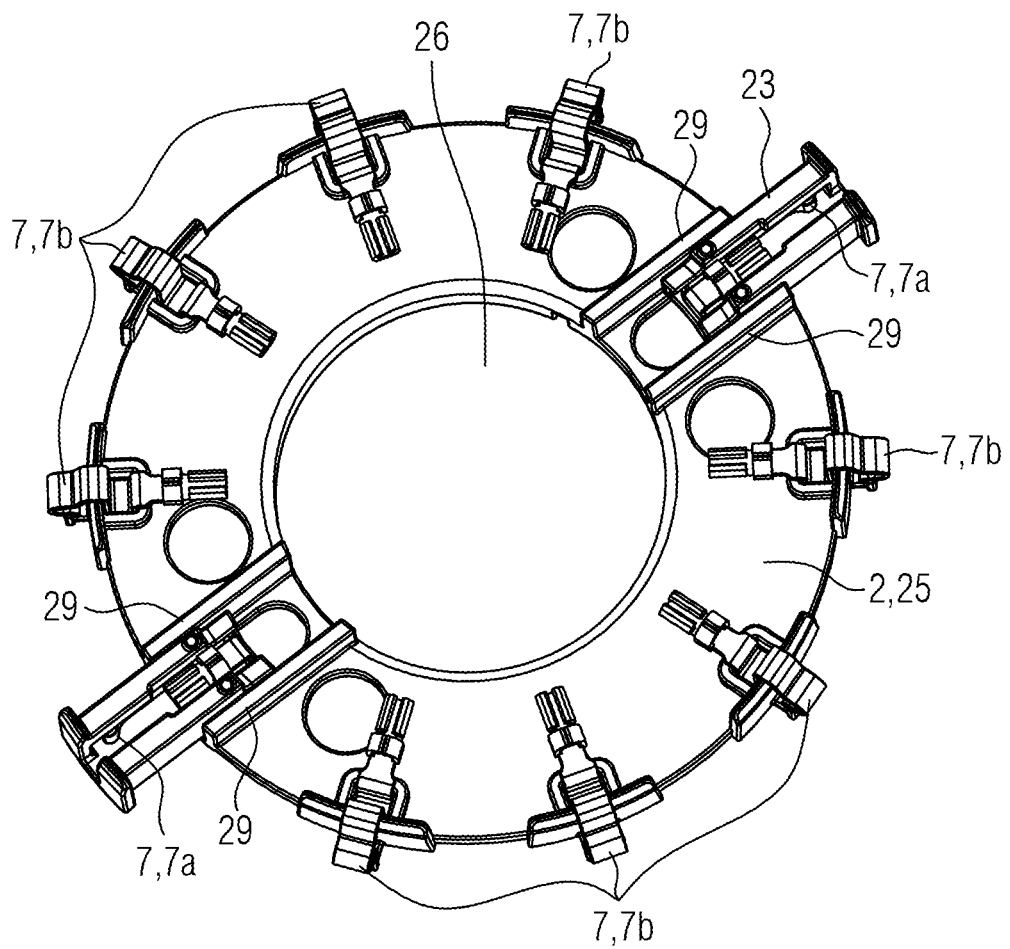
FIG. 7 shows a top-down view of a contact carrier module for a kitchen appliance base according to the teachings of the present disclosure.

The kitchen appliance base 2 further includes an electrical interface 7 that is depicted in various embodiments in FIGS. 2, 3, 4 and 7. The electrical interface 7 according to the embodiments of FIG. 3 and FIG. 4, as well as of FIG. 7, is contactable by an electrical counter-interface 8 depicted by way of example in FIG. 11.

According to FIGS. 2, 3, 4 and 7, the electrical interface 7 respectively includes two power contacts 7a as well as eight auxiliary contacts 7b overall. The auxiliary contacts 7b are configured grouped in two groups, each including four auxiliary contacts, in order to make possible the applying of the preparation module 3 in at least two different orientations with simultaneous contacting of the auxiliary contacts 7b. According to the embodiment of FIG. 11, the counter-interface 8 includes two power counter-contacts 8a that are configured here as contact blades, as well as overall eight auxiliary counter-contacts 8b that are configured here as contact surfaces. In this embodiment the auxiliary counter-contacts 8b are configured grouped, each with four auxiliary counter-contacts 8b. Each power contact 7a is contactable with a power counter-contact 8a. Furthermore, each auxiliary contact 7b is contactable with a corresponding auxiliary counter-contact 8b.

The power contacts 7a serve, for example, for the electrical contacting of a heating device disposed in the preparation module 3. The auxiliary contacts 7b serve, for example, for the contacting of a protective conductor, and/or two auxiliary contacts 7b serve for the transmission of signals for at least one temperature sensor disposed in the preparation module 3, in particular at least one thermocouple, and/or at least one auxiliary contact 7b serves for the contacting of at least one cover contact of the preparation module 3.

Figure 2:
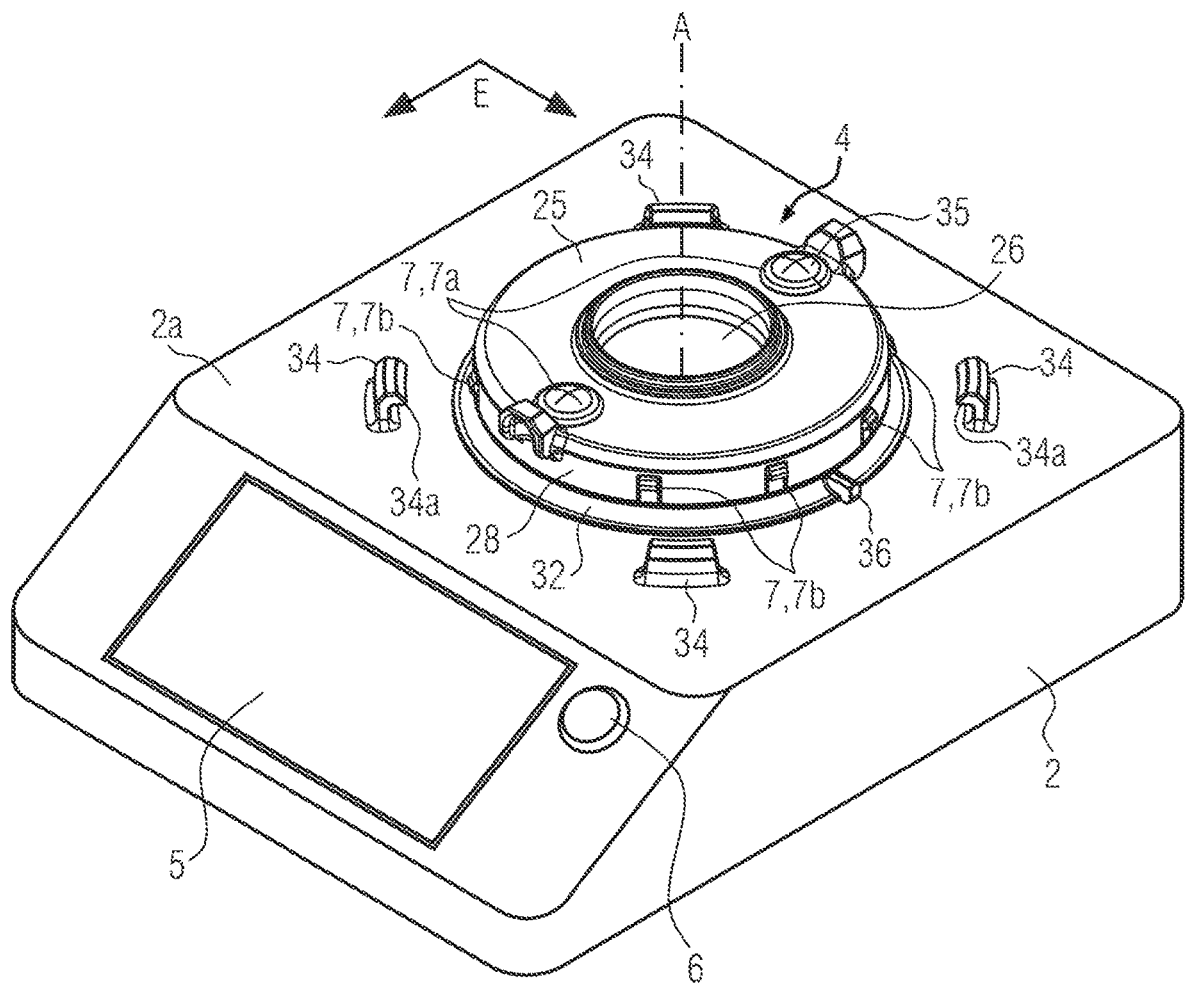
FIG. 2 shows a perspective view of a kitchen appliance base according to the teachings of the present disclosure.

FIG. 2 depicts an embodiment of a kitchen appliance base 2 in perspective view. In the receiving region the power contacts 7a are disposed on a notional circular path having a smaller radius than the auxiliary counter-contacts 8b, which are disposed on a notional circular path having a larger radius. The power contacts 7a are configured as contact sockets. The power contacts 7a are secured against the entry of liquid and contaminants by a permeable sealing cap 35. For this purpose the sealing caps 35 are configured with slots. The auxiliary contacts 7b are configured as resilient contact clamps.

During the disposing of a preparation module 3 in the receiving region 4, the auxiliary contacts 7b are electrically contacted temporally before the power contacts 7a, i.e., at a different point in time. Here "electrically contacted" does not mean the actual application of a voltage or a signal, but rather only the physical contacting with the theoretical possibility of a current- or signal-conduction.

On the respective notional circular path the power contacts 7a or the auxiliary contacts 7b are disposed at different angular positions with respect to each other. The power contacts 7a have an angle of approximately 180° with respect to one another. The auxiliary contacts 7b, in particular the auxiliary contacts 7b of a group including four auxiliary contacts 7b, have approximately an angle of 35° with respect to one another. The two groups including four auxiliary contacts 7b each are disposed opposite each other on the circular path. The power contacts 7a are disposed between the two groups of the auxiliary contacts 7b. Due to this arrangement, a disposing of a preparation module 3 in two different orientations is advantageously made possible, wherein a complete electrical contacting of the preparation module 3 can be effected in both orientations.

Figure 3:
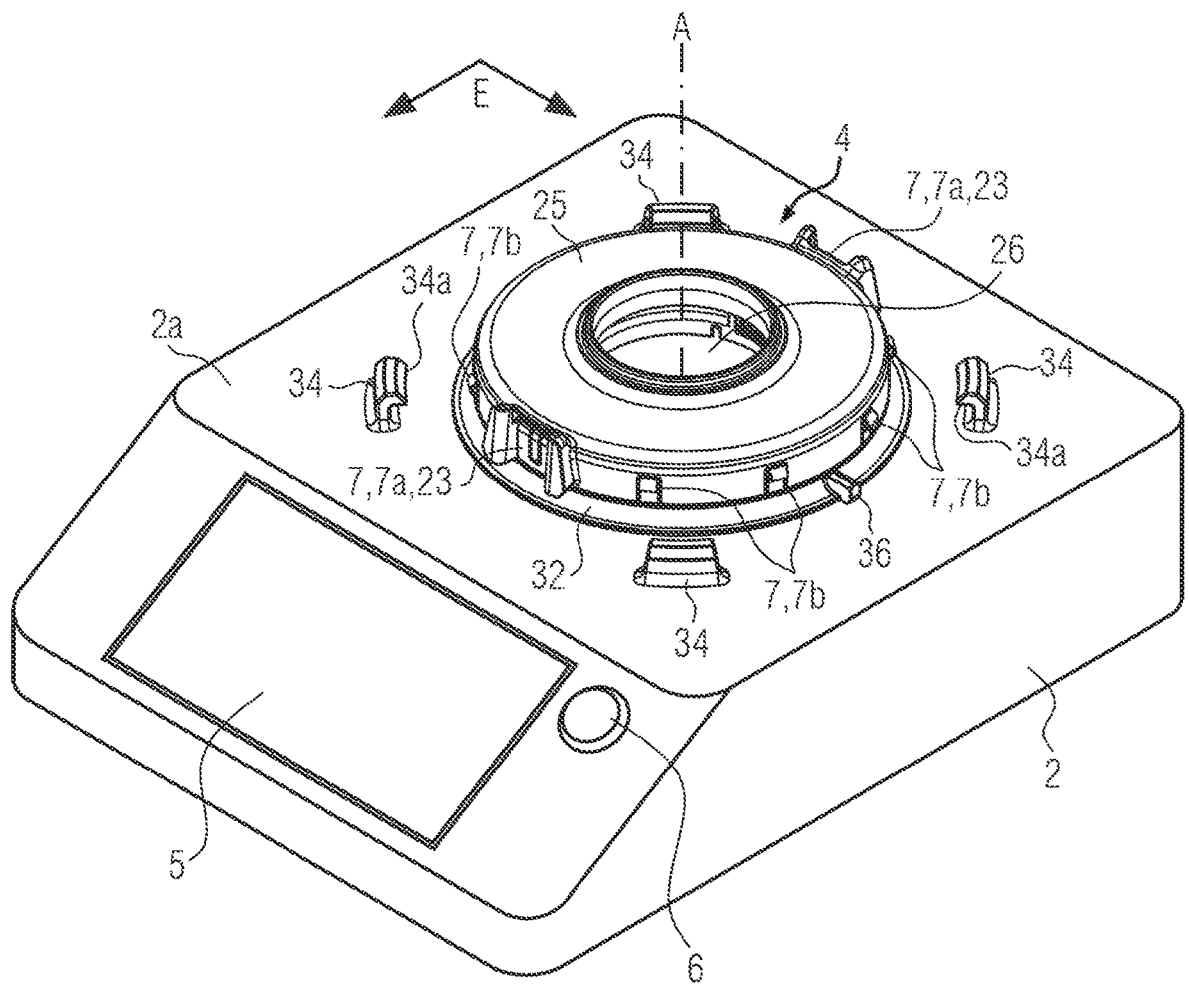
FIG. 3 shows another perspective view of a kitchen appliance base in a first state.
Figure 4:
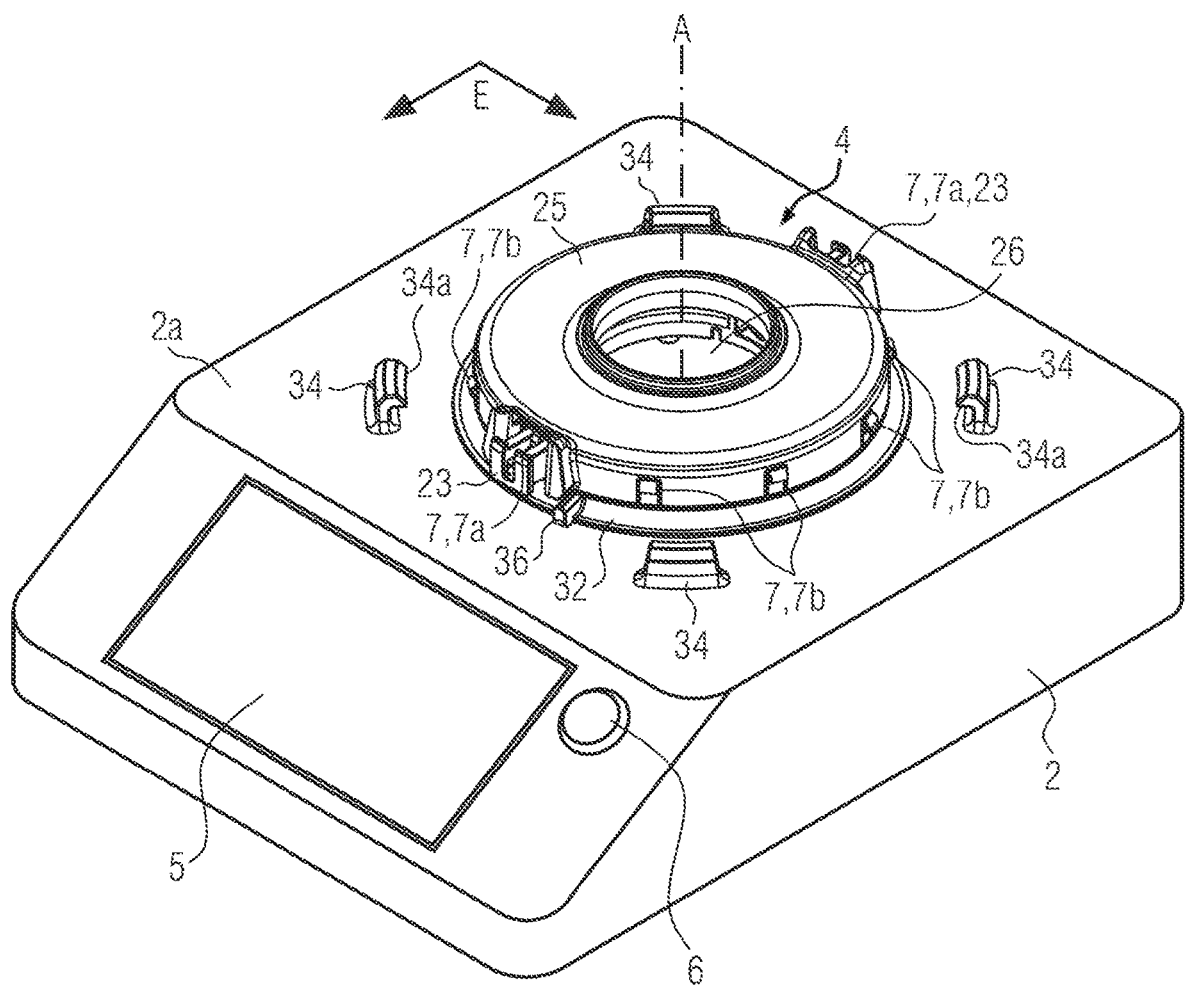
FIG. 4 a perspective view of the kitchen appliance base according to FIG. 3 in a second state.

FIG. 3 and FIG. 4 depict an embodiment of a kitchen appliance base 2, wherein the auxiliary contacts 7b of the electrical interface 7 are disposed stationary on a notional circular path with an angular distance of approximately 35° with respect to one another. The power contacts 7a of the electrical interface 7 are movable between a rest position depicted in FIG. 3 and a contact position depicted in FIG. 4. The two power contacts 7a are movable opposite each other. The moving of the power contacts 7a is advantageously effected after the disposing of a preparation module 3 in the receiving region 4. In this way during the disposing of a preparation module 3 in the receiving region 4 of the kitchen appliance base 2, the user need only overcome the spring force of the auxiliary contacts 7b during the insertion, whereby the insertion force is reduced.

Figure 6A:
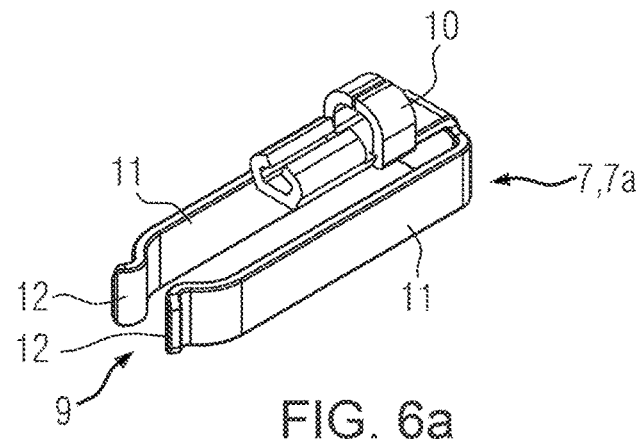
FIG. 6a shows a perspective view of a power contact according to the teachings of the present disclosure.

An embodiment of a power contact 7a is depicted in perspective view in FIG. 6a. The power contact 7a includes a contact region 9 and a terminal region 10. An electrical line (not depicted) can be crimped in the terminal region 10 in order to contact the power contact 7a. The invention also provides that the power contact 7a is attached by insulation-displacement clamping, soldering, or welding. The power contact 7a includes two contact arms 11 extending in opposite directions, which contact arms 11 are curved convex against each other in the contact region 9. On each of the contact arms 11, in the contact region 9 a contact surface 12 is coated with a silver alloy in order to reduce the electrical contact resistance. In the contact region 9, the power contact 7a includes an insertion chamfer in order to advantageously contact a power counter-contact 8a.

Figure 6B:
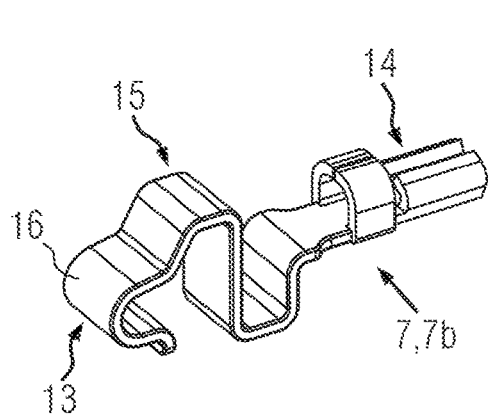
FIG. 6b shows a perspective view of an auxiliary contact according to the teachings of the present disclosure.

FIG. 6b depicts an embodiment of an auxiliary contact 7b in perspective view. The auxiliary contact 7b also includes a contact region 13 and a terminal region 14. An electrical line (not depicted) can be crimped in the terminal region 14. The auxiliary contact 7b includes an essentially step-shaped retaining contour 15 that transitions into a resiliently held, convex-curved contact region 13. In the contact region 13, a contact surface 16 is coated with a coating made of a silver alloy.

Figure 6C:
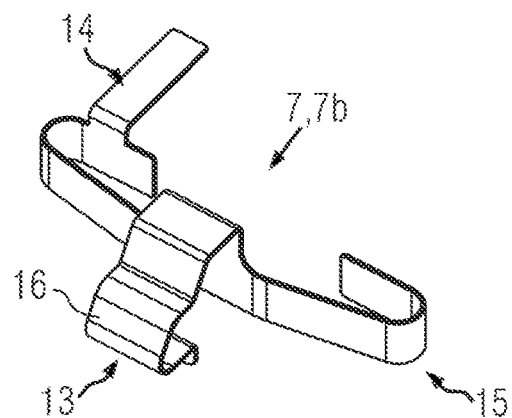
FIG. 6c shows a perspective view of another auxiliary contact according to the teachings of the present disclosure.

FIG. 6c depicts an alternative embodiment of an auxiliary contact 7b in perspective view. The terminal region 14 is configured here for soldering to an electrical line (not depicted). The contact region 13, which is also curved convex, extends from a retaining region 15 and includes a contact surface 16 provided with a coating made of a silver alloy.

In the embodiments depicted in FIGS. 3, 4, 7, 12 and 13, the power contacts 7a are movable by a drive unit 17. A drive unit 17 is depicted by way of example in FIGS. 8 and 12. The drive unit 17 is controlled by a control unit (not depicted) of the kitchen appliance base 2 in order to move the power contacts 7a between the rest position and the contact position, or in particular to lock the preparation module 3 to the kitchen appliance base, preferably simultaneously. According to FIG. 12, the drive unit 17 includes a motor 18 as well as a transmission 20 comprised of a plurality of gears 19. The kitchen appliance 1 is preferably configured and designed such that a contacting is effected by moving the power contacts 7a, and a locking is automatically effected after inserting of the preparation module 3 into the receiving region 4 of the kitchen appliance base 2.

Figure 8:
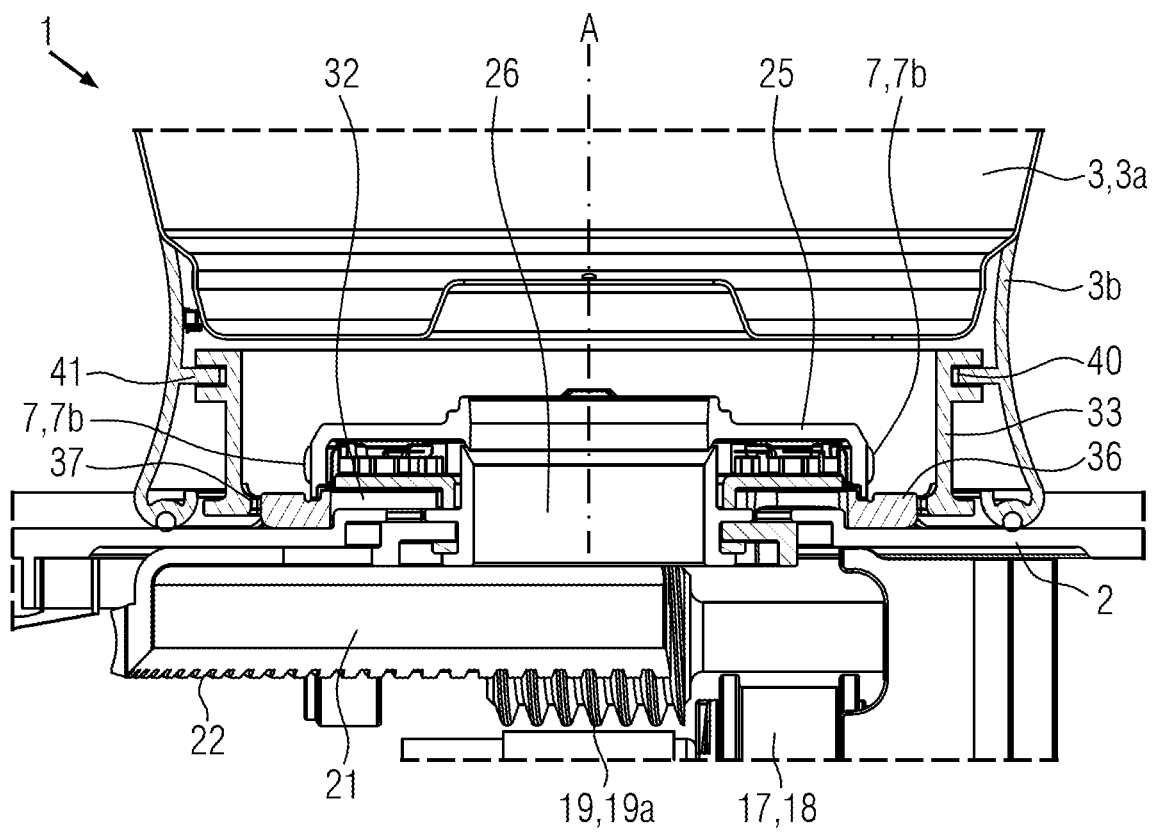
FIG. 8 shows a partial cross-section through a kitchen appliance according to the teachings of the present disclosure that includes a preparation module and a kitchen appliance base.
Figure 12:
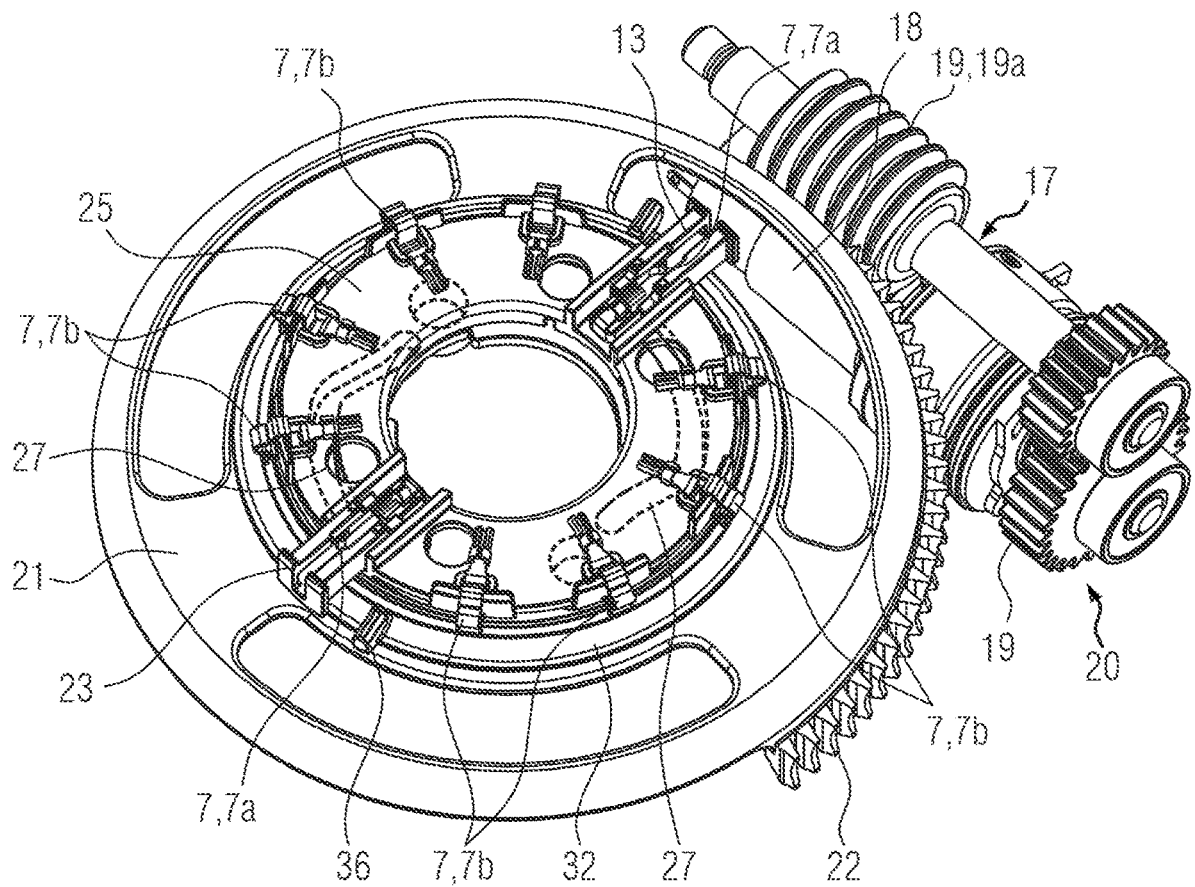
FIG. 12 shows a partial view of a contact carrier module including a locking element and drive lever according to the teachings of the present disclosure.
Figure 13:
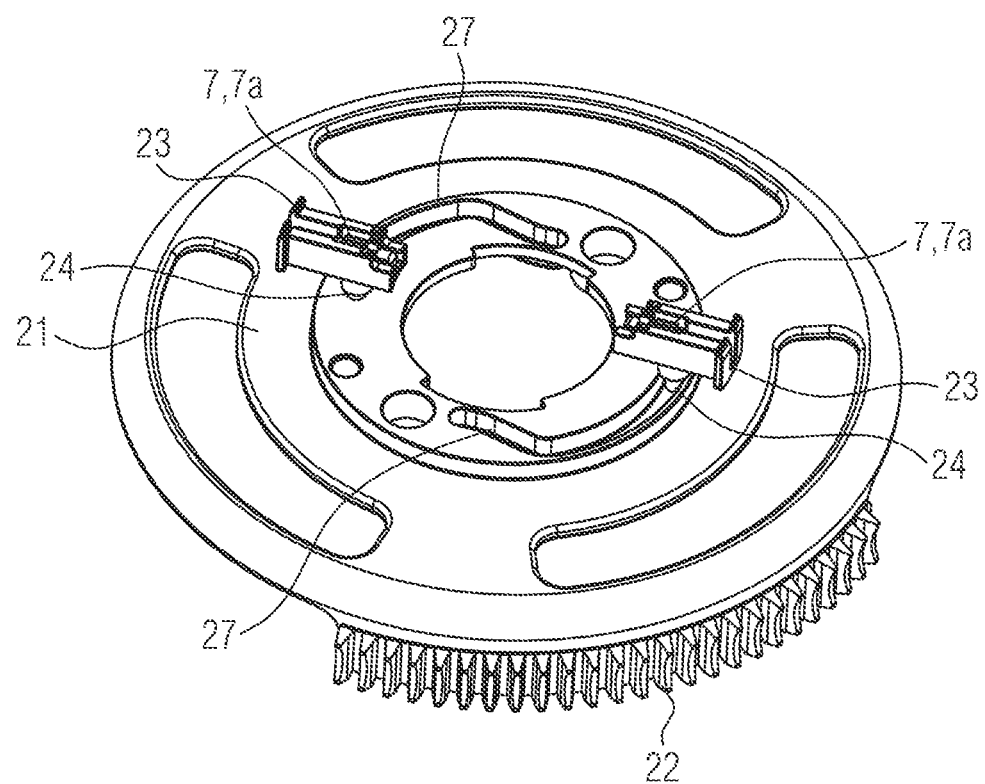
FIG. 13 shows a perspective view of a drive lever according to the teachings of the present disclosure.

The drive unit 17 is in operative connection with a drive lever 21 that is depicted, for example, in FIGS. 8, 12 and 13. In the embodiment according to FIG. 8, the drive lever 21 has a circular segment shape. In the embodiments of FIGS. 12 and 13, the drive lever 21 is configured annular. In all embodiments of FIGS. 8, 12 and 13, the drive lever 21 is rotatable by the drive unit 17, in that the drive unit 17 cooperates with a worm gear 19a having an arch-shaped toothed bar 22 formed on the drive lever 21—see in particular FIG. 8 and FIG. 12.

FIG. 12 depicts an embodiment of a drive lever 21 including disposed drive unit 17 as well as a contact carrier module 25, on which the power contacts 7a and the auxiliary contacts 7b are disposed. The power contacts 7a and the auxiliary contacts 7b are disposed on a circumferential surface 28 of the contact carrier module 25. The contact carrier module 25 includes a central opening 26 for the passage of a drive interface, in particular a motor shaft, in the installation state on a kitchen appliance base 2. The contact carrier module 25 is depicted at least partially transparent in order to be able to describe the action mechanisms. According to the embodiments of FIGS. 3, 4, 8, 9, 10 and 12, the contact carrier module 25 is disposed in the receiving region 4 of the kitchen appliance base 2.

The power contacts 7a depicted in FIG. 12 are connected to the drive unit 17 via the drive lever 21 such that they are movable by the drive unit 17 between a rest position—see FIG. 3—and a contact position—see FIG. 4 and FIG. 12. According to FIGS. 3 and 4, the contact carriers 23 are guided in the contact carrier module 25 such that they emerge from the circumferential surface 28 on opposite sides when they move toward the contact position depicted in FIG. 4.

In order to be able to advantageously move the power contacts 7a, according to FIG. 12 the power contacts 7a are held in a contact carrier 23. The power contacts 7a of the embodiments of FIGS. 3, 4, 7 and 13 are each disposed in a contact carrier 23.

Figure 5:
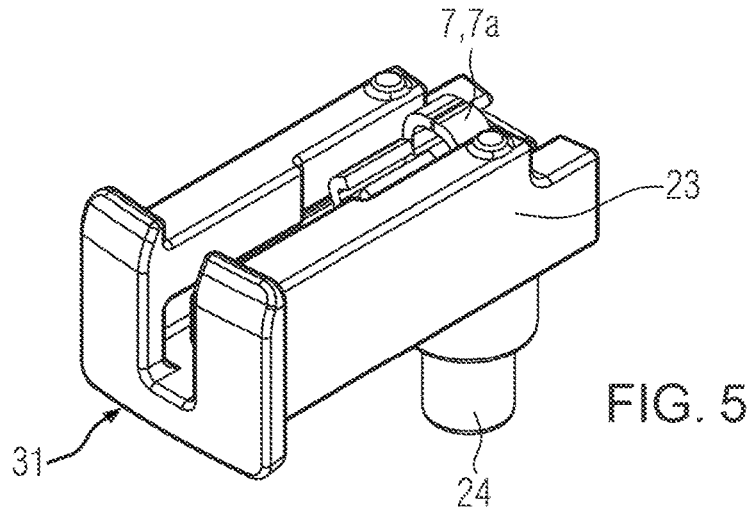
FIG. 5 shows a perspective view of a contact carrier according to the teachings of the present disclosure.

FIG. 5 depicts an embodiment of a contact carrier 23 in perspective view. The contact carrier 23 of FIG. 5 corresponds to the contact carriers 23 shown in FIGS. 3, 4, 7 and 13. The contact carrier 23 includes a drive projection 24 that is configured as pin-shaped. The contact carrier 23 surrounds the power contact 7a— see FIG. 6a— such that the power contact 7a in the contact position—even with the not-present preparation module 3—cannot be directly contacted by a user. The existing gaps are configured smaller than the diameter of an average finger.

In the installed state according to FIGS. 7 and 12, the contact carriers 23 are guided on both sides in guide rails 29 on the contact carrier module 25 such that the contact carriers 23 together with the power contacts 7a are movable translationally between a rest position and a contact position depicted in FIGS. 7 and 12. The movement of the contact carrier 23 is effected directed essentially radially toward the central axis A or radially away from the central axis A.

The movement of the contact carriers 23 on the contact carrier module 25 is effected by the interaction of the drive projection 24 of the respective contact carrier 23—see FIG. 5—and respectively a cutout 27 in the drive lever 21—see FIG. 12 and FIG. 13. The cutouts 27 are shaped such that they guide the drive projection 24 of the contact carrier 23 such that a rotation of the drive lever 21 effected by the drive unit 17 is converted into a translational movement of the contact carriers 23. Here the contact carriers 23 are guided in the guide rails 29—see FIG. 7 and FIG. 12. The rotational direction of the drive lever 21 determines here whether the contact carriers 23 are moved outward with respect to the contact carrier module 25—into the contact position—or inward—into the rest position.

FIG. 7 depicts an embodiment of a contact carrier module 25 according to FIGS. 3, 4 and 12 without top cover. The auxiliary contacts 7b are spaced at an angle of approximately 35° with respect to each other in a group of auxiliary contacts 7b. Between the two groups of auxiliary contacts 7b, the power contacts 7a are spaced at an angle of approximately 180° with respect to each other. The auxiliary contacts 7b are stationary. The power contacts 7a are movable with the contact carriers 23 in the guide rails 29. FIG. 7 shows the power contacts 7a in the contact position.

In the rest position of the power contacts 7a depicted in FIG. 3, a gap 30 is formed between the contact carrier module 25 and the contact carrier 23. The gap 30 is formed in particular between a head region 31 of the contact carrier 23 and the contact carrier module 25, in particular its circumferential surface 28. The gap 30 is dimensioned with a lowest-possible tolerance, so that no or only very little liquid, in particular from a spray-protection perspective, can penetrate into the contact carrier module 25. The cleaning of the receiving region 4 is thereby also simplified.

Figure 9:
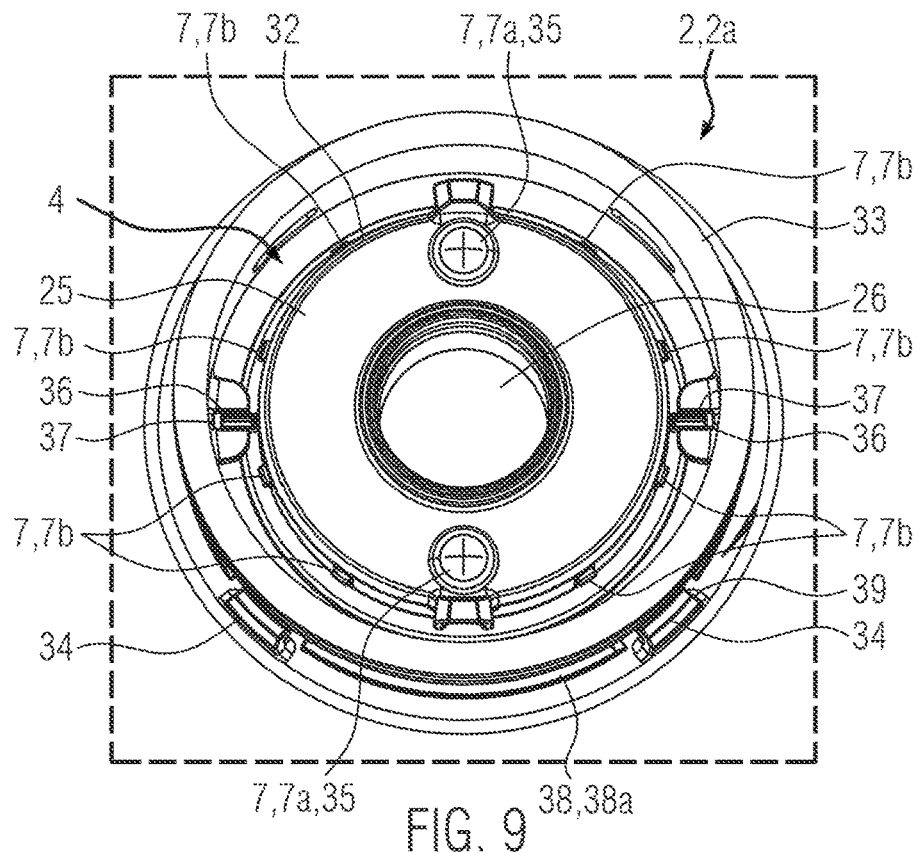
FIG. 9 shows a plan view of a kitchen appliance base including a locking counter-element in a first state.
Figure 10:
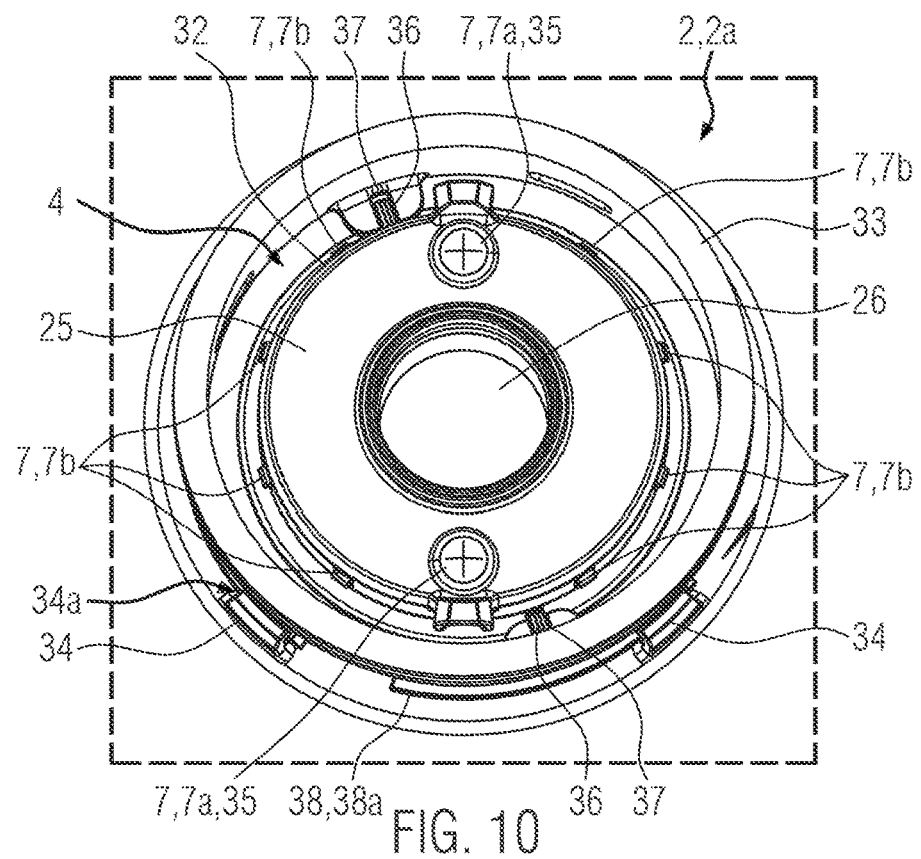
FIG. 10 shows a plan view of a kitchen appliance base including a locking counter-element in a second state.

The embodiments of FIGS. 2, 3, 4, 8, 9, 10 and 12 further include a locking element 32. The locking element 32 is disposed on the kitchen appliance base 2 such that it is rotatably held between a top side 2a of the kitchen appliance base 2 and the contact carrier module 25. In particular, the locking element 32 is coupled to the drive lever 21, so that the locking element 32 is movably held by the drive unit 17 between a release position and a locking position. The release position is shown, for example, in FIGS. 2, 3 and 9, while the locking position is shown in FIG. 4 and FIG. 10. In the release position, a preparation module 3 can be disposed in at least two orientations in the receiving region 4. In the locking position, a start-up of the kitchen appliance base 2 can be effected together with the preparation module 3, namely of the kitchen appliance 1.

The locking element 32 is configured as essentially annular. The locking element 32 includes at least two carrier contours 36 that are configured here as carrier ribs. In the preparation module 3 disposed in the receiving region 4, the carrier contours 36 interact in a positive-locking manner with, for example, carrier counter-contours 37, depicted in FIGS. 8, 9, and 10, on a locking counter-element 33 of the preparation module 3. The carrier contours 36 and carrier counter-contours 37 are disposed and configured such that the preparation module 3 can be disposed in at least two different orientations in the receiving region 4.

FIG. 9 and FIG. 10 depict an embodiment of a receiving region 4 of a kitchen appliance base 2 according to FIG. 2 in perspective detail view. The locking counter-element 33 of a preparation module 3 is depicted separately for illustration of the mechanical locking. The carrier contours 36 engage in carrier counter-contours 37 in a positive-locking manner. Due to the positive lock, a movement, effected by the drive unit 17, of the locking element 32 is transmitted to the locking counter-element 33, so that the locking counter-element 33 is also moved from a release position—see FIG. 9—into a locking position—see FIG. 10.

The locking counter-element 33 is configured as a locking counter-ring, and includes a circumferential locking section 38 that is interrupted by openings 39. In the release position according to FIG. 9, the openings 39 serve to allow the locking contours 34 provided on the top side 2a of the kitchen appliance base 2 to engage behind the locking sections 38 in order to interact in a positive-locking manner with the locking sections 38 in the locking position shown in FIG. 10, and thus to lock the preparation module 3 mechanically to the kitchen appliance base 2. Such locking contours 34 are, for example, also provided in the exemplary embodiments of FIG. 2, FIG. 3 and FIG. 4.

According to FIG. 9 and FIG. 10, the locking sections 38 each include a locking surface 38a which, in the locking state according to FIG. 10, interacts in a positive-locking manner with a locking counter-surface 34a or abuts thereon. The locking contours 34 are configured essentially as hook-shaped. On the top side of the kitchen appliance base 2, at least four locking contours 34 are provided. The locking contours 34 are optional. It also falls within the context of the present invention that the mechanical locking is effected by other means, in particular by means other than the locking contours 34. For example, the present disclosure provides that the locking element 32 interacts directly in a positive-locking manner with a preparation module 3 in order to lock the preparation module 3 to the kitchen appliance base 2.

Figure 11:
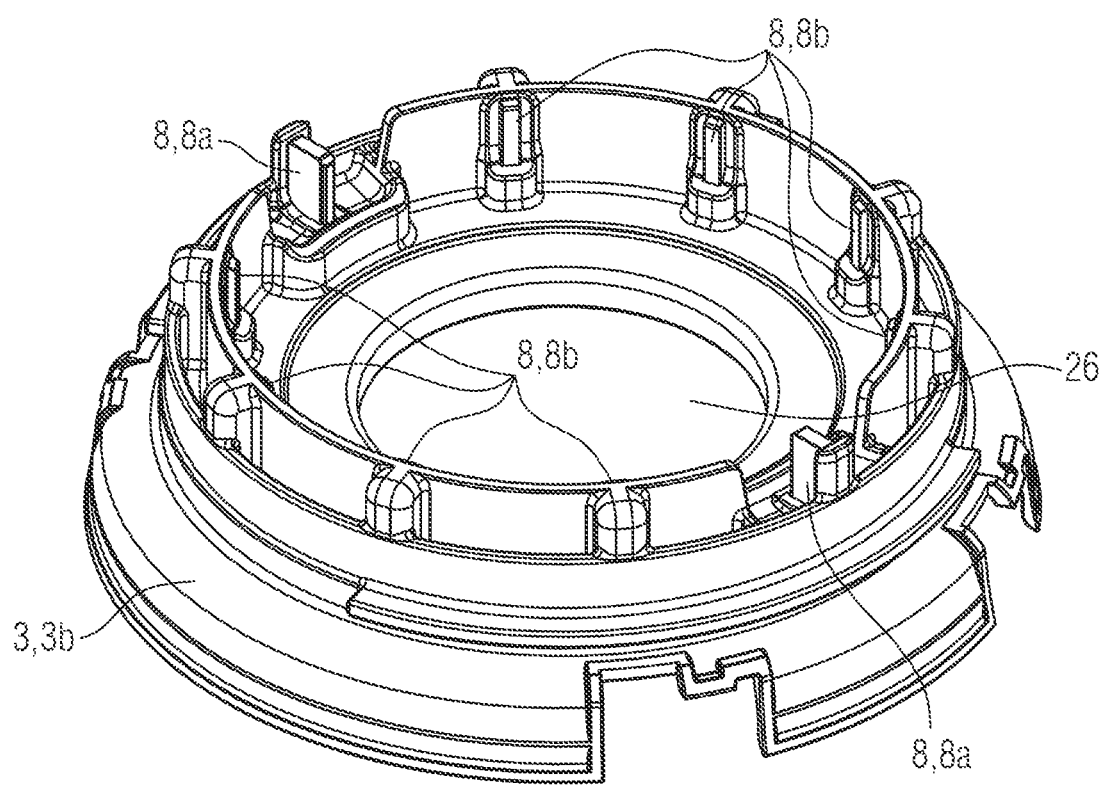
FIG. 11 shows a perspective view of a base section of a preparation module according to the teachings of the present disclosure.
Figure 14:
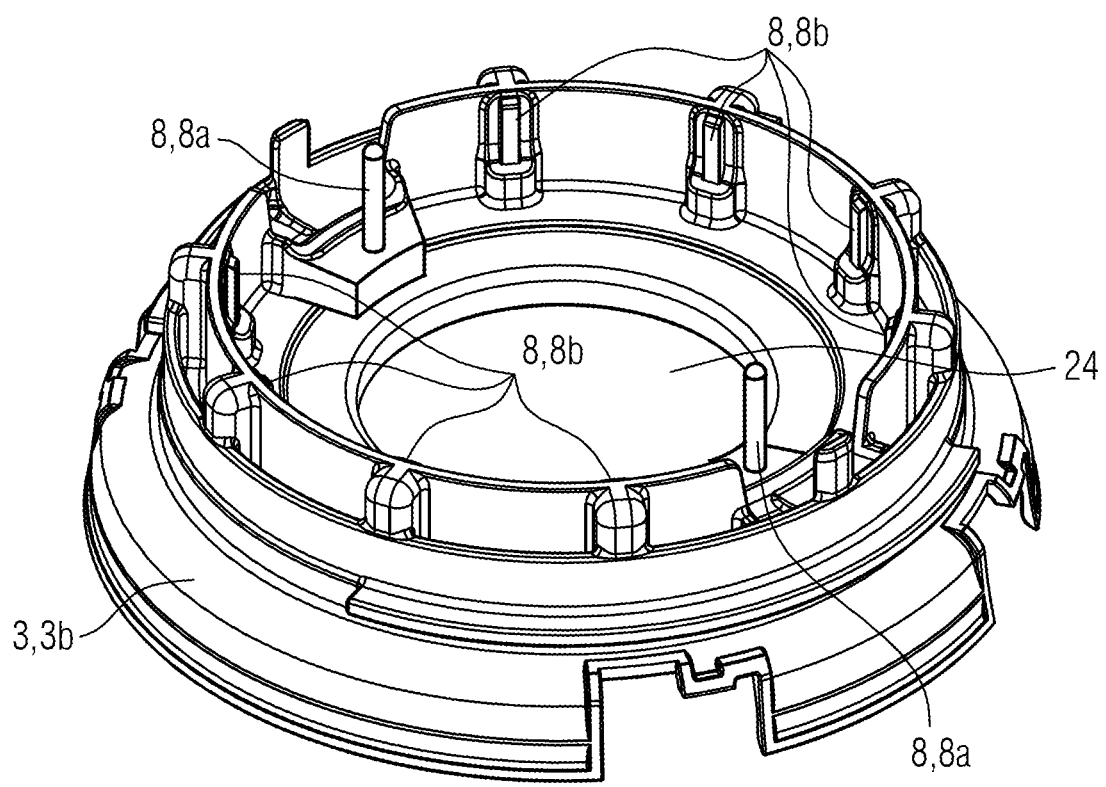
FIG. 14 shows a perspective view of a base section of a preparation module according to the teachings of the present disclosure.

FIG. 8 shows a partial section through a kitchen appliance 1 including preparation module 3 and kitchen appliance base 2. The preparation module 3 is disposed in the receiving region 4. The preparation module 3 is configured here as a preparation vessel including preparation interior 3*a* and base section 3*b*. For illustration, only the means for mechanical locking of the preparation module 3 to the kitchen appliance base 2 are depicted. For the electrical contacting, furthermore the arrangement of an electrical counter-interface 8, in particular similar to those depicted in FIG. 11 or FIG. 14, is required. The locking counter-element 33, according to FIG. 8 also in the shape of a locking counter-ring, includes a circumferential groove 40 that interacts with an associated bridge 41 in a base section 3*b* of the preparation module 3 such that the locking counter-element 33 is rotatable on the preparation module 3.

As already described with respect to FIG. 9 and FIG. 10, the rotation of the locking counter-element 33 is effected between a release position and a locking position by the interaction of the carrier contours 36 of the locking element 32 with the carrier counter-contours 37 on the locking counter-element 33. The rotation of the locking element 32 is in turn effected by a transmission of a torque from the drive lever 21 that is in turn moved by the drive unit 17. Here the drive lever 21 is configured as circle-segment-shaped and connected to the locking element 32 in a positive-locking manner.

Compared to conventional technology, this design has the advantage that with an extremely flat design a reliable and automatic contacting and locking of the preparation module 3 to the kitchen appliance base 2 can be effected. The central opening 26 can be traversed by a mechanical drive interface.

FIG. 11 depicts an embodiment of a part of a base section 3*b* for a preparation module 3. The base section 3*b* includes an electrical counter-interface 8 that includes two power counter-contacts 8*a* in the shape of contact blades, and eight auxiliary counter-contacts 8*b* in the shape of contact surfaces. Such a base section 3*b* can, for example, interact with a kitchen appliance base 2 according to FIG. 3 and FIG. 4. The base section 3*b* is disposed on preparation modules 3 having different functions. The auxiliary counter-contacts 8*b* are contacted during the disposing in the receiving region 4, but the power counter-contacts 8*a* are contacted only when the contact carriers 23 are in the contact position (see FIGS. 4, 7 and 12).

FIG. 14 depicts an embodiment of a part of a base section 3*b* for a preparation module 3. The base section 3*b* includes an electrical counter-interface 8 that includes two power counter-contacts 8*a* in the shape of contact pins, and eight auxiliary counter-contacts 8*b* in the shape of contact surfaces. Such a base section 3*b* can interact, for example, with a kitchen appliance base 2 according to FIG. 2. The base section 3*b* is disposed on preparation modules 3 having different functions. During the disposing in the receiving region 4, the auxiliary counter-contacts 8*b* are contacted temporally before the power counter-contacts 8*a*.

The invention is not limited to the exemplary embodiments shown and described, but rather also comprises all embodiments which work the same way in the sense of the invention. It is emphasized that the exemplary embodiments are not limited to all features in combination, rather each individual partial feature can also have inventive significance in isolation from all other partial features. Furthermore, the invention is so far not yet limited to the combinations of features defined in any embodiment, but rather can also be defined by any other combination of specific features of all of the individual features disclosed. This means that in principle practically any individual feature of an embodiment can be removed or replaced by another individual feature disclosed elsewhere in the application. In other words, embodiments have been described in a way which enables a clear and concise specification to be written, but it is intended and will be appreciated that embodiments may be variously combined or separated without parting from the invention. For example, it will be appreciated that all preferred features described herein are applicable to all aspects of the invention described herein.

The foregoing description of various forms of the invention has been presented for purposes of illustration and description. It is not intended to be exhaustive or to limit the invention to the precise forms disclosed. Numerous modifications or variations are possible in light of the above teachings. The forms discussed were chosen and described to provide the best illustration of the principles of the invention and its practical application to thereby enable one of ordinary skill in the art to utilize the invention in various forms and with various modifications as are suited to the particular use contemplated. All such modifications and variations are within the scope of the invention as determined by the appended claims when interpreted in accordance with the breadth to which they are fairly, legally, and equitably entitled.

The invention claimed is:

1. A kitchen appliance comprising:
   at least one kitchen appliance base, the kitchen appliance base including at least one electrical interface and at least one receiving region, the electrical interface having at least two power contacts and at least one auxiliary contact; and
   at least one preparation module, the preparation module including at least one electrical counter-interface configured for electrical contact with the electrical interface, the electrical counter-interface having at least two power counter-contacts and at least one auxiliary counter-contact;
   wherein the power contacts and the power counter-contacts, as well as the auxiliary contact and the auxiliary counter-contact, are designed and configured such that the power contacts are electrically contacted with the power counter-contacts at a different point in time than the auxiliary contact is electrically contacted with the auxiliary counter-contact.

2. The kitchen appliance according to claim 1, wherein the power contacts and/or the auxiliary contact and/or the power counter-contacts and/or the auxiliary counter-contact are disposed on a notional, common circular path at different angular positions with respect to each other, or that the power contacts and/or the auxiliary contact and/or the power counter-contacts and/or the auxiliary counter-contact are disposed on notional, different circular paths having different radii, each at different angular positions.

3. The kitchen appliance according to claim 1, wherein at least one of the power contacts and/or at least the auxiliary contact of the electrical interface, during and/or after the disposing of the preparation module in the receiving region, is movable on the kitchen appliance base from a rest position at least toward a contact position, and/or that at least one of the power counter-contacts and/or at least the auxiliary counter-contact of the electrical counter-interface, during and/or after the disposing of the preparation module in the receiving region, is movable on the preparation module from a rest position at least toward a contact position.

4. The kitchen appliance according to claim 1, wherein the power contacts, the power counter-contacts, the auxiliary contact, and the auxiliary counter-contact are manufactured from an electrically conductive material, and that at least one contact surface, of the power contacts, the power counter-contacts, the auxiliary contact and/or the auxiliary counter-contact is at least partially provided with a coating for reducing the transition resistance.

5. The kitchen appliance according to claim 1, wherein the power contacts, the auxiliary contact, the power counter-contacts and/or the auxiliary counter-contact is/are at least indirectly movable by a drive unit.

6. The kitchen appliance according to claim 5, wherein the kitchen appliance base includes at least one drive lever, the drive lever being indirectly or directly rotatable by the drive unit, and at least one of the power contacts, at least the auxiliary contact, at least one of the power counter-contacts, and/or at least the auxiliary counter-contact interacts/interact with the drive lever such that a movement of the drive lever effects a movement of at least one of the power contacts, at least the auxiliary contact, at least one of the power counter-contacts, and/or at least the auxiliary counter-contact from a rest position into a contact position.

7. The kitchen appliance according to claim 3, wherein at least one of the power contacts, at least the auxiliary contact, at least one of the power counter-contacts and/or at least the auxiliary counter-contact is/are disposed on at least one contact carrier, and that the contact carrier together with the at least one power contact, at least the auxiliary contact, the at least one power counter-contact and/or at least the auxiliary counter-contact, is movably held.

8. The kitchen appliance according to claim 6, wherein the drive lever includes at least one cutout for interacting with at least one drive projection of the contact carrier, the cutout being shaped such that a rotation of the drive lever effects a translational movement of the contact carrier.

9. The kitchen appliance according to claim 3, wherein the kitchen appliance base includes at least one contact carrier module, such that in the rest position, the power contacts and/or the auxiliary contact are/is introduced into the contact carrier module, and that when in the contact position, the power contacts and/or the auxiliary contact at least partially protrude from the contact carrier module.

10. The kitchen appliance according to claim 9, wherein on a circumferential surface of the contact carrier module in the rest position, a gap is formed between the contact carrier, in a head region of the contact carrier and the contact carrier module, such that the risk of a liquid entry is minimized, by at least one seal being disposed between contact carrier and contact carrier module.

11. The kitchen appliance according to claim 1, wherein the kitchen appliance base includes at least one locking element, the locking element being movably held between a release position and a locking position,
wherein in the release position, the preparation module can be disposed in at least two orientations in the receiving region,
wherein in the locking position, a locking of the preparation module to the kitchen appliance base is effected.

12. The kitchen appliance according to claim 11, wherein in the preparation module disposed in the receiving region, the locking element interacts in a positive-locking manner with at least one locking counter-element of the preparation module, so that a movement, in particular a rotational movement of the locking element effects a movement, in particular a rotation of the locking counter-element, that the locking counter-element is movable by the locking element between a release position and a locking position, and that in the locking position the locking counter-element interacts with locking contours on the kitchen appliance base in a positive-locking manner, whereby a locking of the preparation module to the kitchen appliance base is effected.

13. The kitchen appliance according to claim 6, wherein the drive lever and also a locking element, are rotatably, driven at least indirectly by the drive unit, and that the drive unit is disposed outside a center of rotation of the locking element.

14. A kitchen appliance base for a kitchen appliance, according to claim 1, the kitchen appliance base including at least one electrical interface and at least one receiving region, the electrical interface including at least two power contacts and at least one auxiliary contacts,
wherein at least one of the power contacts and/or at least the auxiliary contact of the electrical interface during and/or after the disposing of a preparation module in the receiving region, is movable on the kitchen appliance base from a rest position at least toward a contact position.

15. A preparation module for a kitchen appliance, according to claim 1, the preparation module including at least one electrical counter-interface for electrical contacting with the electrical interface of a kitchen appliance base, the electrical counter-interface including at least two power counter-contacts and at least one auxiliary counter-contact,
wherein at least one of the power counter-contacts and/or at least the auxiliary counter-contact of the electrical counter-interface during and/or after the disposing of the preparation module in the receiving region, is movable on the preparation module from a rest position at least toward a contact position.

16. The kitchen appliance according to claim 4, wherein the coating is made of an alloy that contains at least gold and/or silver.

17. The kitchen appliance according to claim 5, wherein the drive unit includes at least one motor and at least one gear or includes at least one transmission.

18. The kitchen appliance according to claim 17, wherein the at least one gear comprises at least one spur-, conical-, and/or worm-gear.

19. The kitchen appliance according to claim 7, wherein the drive lever includes at least one cutout for interacting with at least one drive projection of the contact carrier, the cutout being shaped such that a rotation of the drive lever effects a translational movement of the contact carrier.

20. The kitchen appliance according to claim 11, wherein in the locking position of the locking element at least the power contacts are located in the contact position, and in the release position of the locking element in the rest position, the locking element is movable by the drive lever.

21. The kitchen appliance according to claim 12, wherein a drive lever and also the locking element are rotatably, driven at least indirectly by a drive unit, and that the drive unit is disposed outside a center of rotation of the locking element.

* * * * *